United States Patent
Fuji

(10) Patent No.: US 12,467,836 B2
(45) Date of Patent: Nov. 11, 2025

(54) ANALYTICAL PRETREATMENT METHOD OF MICROPLASTICS

(71) Applicant: SHIMADZU CORPORATION, Kyoto (JP)

(72) Inventor: Risa Fuji, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 624 days.

(21) Appl. No.: 17/887,560

(22) Filed: Aug. 15, 2022

(65) Prior Publication Data

US 2023/0122953 A1   Apr. 20, 2023

(30) Foreign Application Priority Data

Oct. 18, 2021 (JP) .................... 2021-170324

(51) Int. Cl.
| | | |
|---|---|---|
| *G01N 1/34* | (2006.01) | |
| *G01N 1/40* | (2006.01) | |
| *G01N 1/44* | (2006.01) | |
| *G01N 33/44* | (2006.01) | |

(52) U.S. Cl.
CPC .............. *G01N 1/34* (2013.01); *G01N 1/4044* (2013.01); *G01N 1/4077* (2013.01); *G01N 1/44* (2013.01); *G01N 33/442* (2013.01); *G01N 2001/4088* (2013.01)

(58) Field of Classification Search
CPC ...... G01N 1/34; G01N 1/4044; G01N 1/4077; G01N 1/44; G01N 33/442; G01N 2001/4088; G01N 1/2813; G01N 1/28; G01N 21/3563; G01N 2021/3572; Y02W 30/62

See application file for complete search history.

(56) References Cited

U.S. PATENT DOCUMENTS

| | | |
|---|---|---|
| 2021/0260501 A1 | 8/2021 | Lu et al. |
| 2022/0226834 A1 | 7/2022 | Garcia et al. |

FOREIGN PATENT DOCUMENTS

| | | |
|---|---|---|
| CN | 106756036 A | 5/2017 |
| CN | 110426444 A | 11/2019 |
| CN | 111167190 A | 5/2020 |
| CN | 111337327 A | 6/2020 |
| CN | 112525621 A | 3/2021 |

(Continued)

OTHER PUBLICATIONS

European Patent Office machine translation of CN112525635 (A) (Year: 2025).*

(Continued)

*Primary Examiner* — Jennifer Wecker
*Assistant Examiner* — Steven Ray Castaneda
(74) *Attorney, Agent, or Firm* — Sughrue Mion, PLLC

(57) ABSTRACT

An analytical pretreatment method of microplastics includes: placing the microplastics separated by a gravity separation treatment in a sieve; immersing the sieve containing the microplastics in pure water having a depth smaller than a height of the sieve; and lifting the sieve up from the pure water and drying the microplastics contained in the sieve with a constant temperature dryer. Thus, the analytical pretreatment method of microplastics is capable of reducing the influence of a gravity separation solution on the analysis result of the microplastics.

2 Claims, 5 Drawing Sheets

(56) References Cited

FOREIGN PATENT DOCUMENTS

| | | | | |
|---|---|---|---|---|
| CN | 112525635 A | * | 3/2021 | ......... B01D 11/0492 |
| CN | 112903349 A | * | 6/2021 | ............... G01N 1/10 |
| CN | 113155558 A | * | 7/2021 | ............... G01N 1/28 |
| FR | 2 484 867 A1 | | 12/1981 | |
| IN | 201821045447 A | | 9/2019 | |
| JP | 6811370 B1 | | 1/2021 | |
| WO | 2020/240069 A1 | | 12/2020 | |

OTHER PUBLICATIONS

European Patent Office machine translation of CN112903349 (A) (Year: 2025).*
European Patent Office machine translation of CN113155558 (A) (Year: 2025).*
Office Action issued Jun. 7, 2025 in Japanese Application No. 2021-170324.
Office Action issued Jun. 10, 2025 in Chinese Patent Application No. 202211212534.1.
Office Action issued Jun. 10, 2025 in Japanese Application No. 2021-170324.
Office Action issued Aug. 26, 2025 in Chinese Patent Application No. 202211212534.1.

* cited by examiner

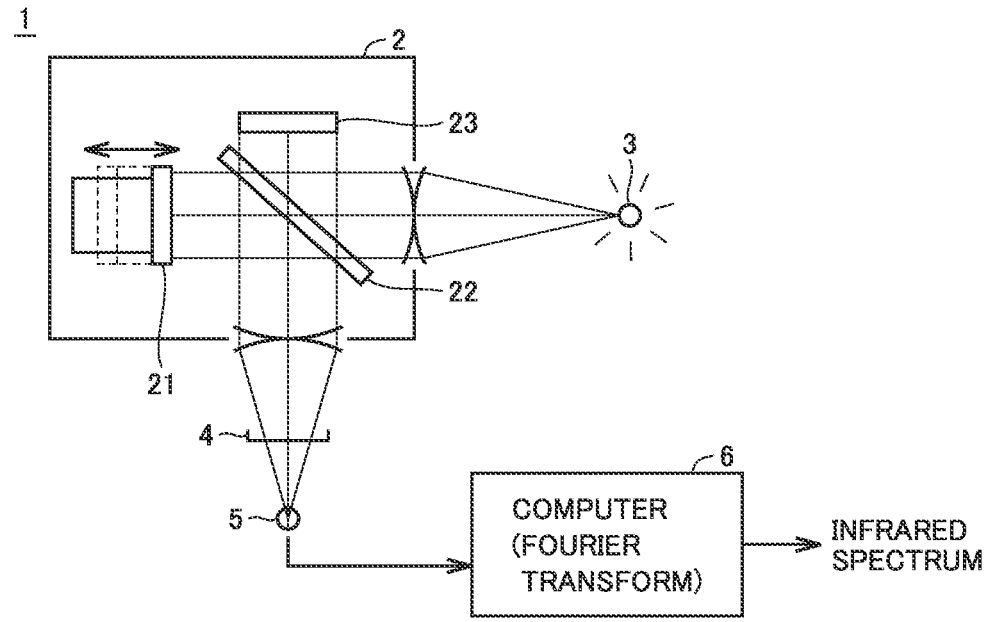
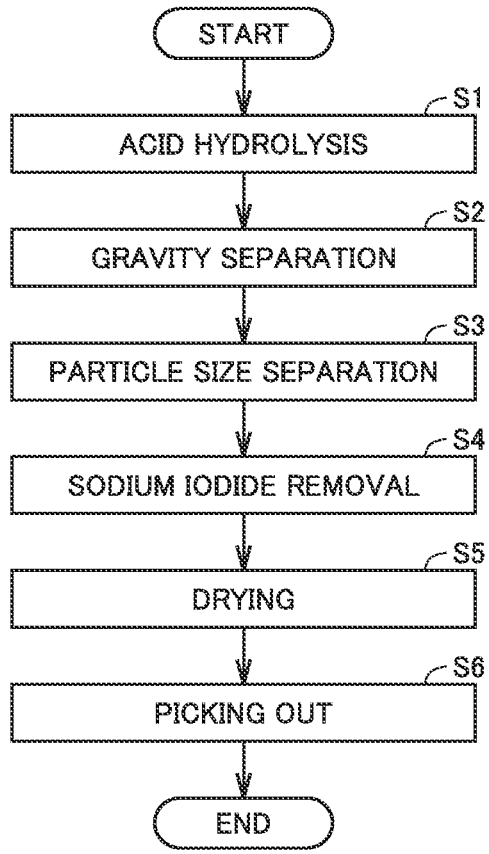

ANALYTICAL PRETREATMENT METHOD OF MICROPLASTICS

BACKGROUND OF THE INVENTION

Field of the Invention

The present disclosure relates to an analytical pretreatment method of microplastics.

Description of the Background Art

Microplastics are defined as tiny plastic particles (D=5 mm or less). Since chemical substances containing or adsorbing microplastics have been incorporated into food chain, their influence on the ecological system is concerned.

In order to investigate and address the influence of such microplastics, it is necessary to analyze these microplastics. For example, Japanese Patent No. 6811370 discloses a technique of preparing a sample to be used in the analysis of microplastics.

SUMMARY OF THE INVENTION

For example, a Fourier transform infrared spectrophotometer (FTIR) is generally used to analyze components of the microplastics. In order to perform such analysis, firstly, it is required to remove impurities from ambient water sampled from a river or an ocean, and then an analytical pretreatment is performed so as to collect only the microplastics through gravity separation using sodium iodide.

However, the components of a gravity separation solution such as sodium iodide may affect the analysis result of the microplastics from the Fourier transform infrared spectrophotometer, and if the microplastics are not sufficiently dried after the analytical pretreatment, the IR peaks of water may overlap with the IR peaks of the microplastics, and however, drying the microplastics sufficiently is time consuming.

An object of the present disclosure is to provide an analytical pretreatment method of microplastics capable of reducing the influence of a gravity separation solution on an analysis result of the microplastics.

A first aspect of the present disclosure relates to an analytical pretreatment method of microplastics separated by a gravity separation treatment. The analytical pretreatment method includes: placing the microplastics separated by the gravity separation treatment in a sieve; immersing the sieve containing the microplastics in pure water having a depth smaller than a height of the sieve; and lifting the sieve up from the pure water and drying the microplastics contained in the sieve with a constant temperature dryer.

The analytical pretreatment method of microplastics of the present disclosure is capable of reducing the influence of a gravity separation solution such as sodium iodide on the analysis result of the microplastics.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram for explaining an analysis using a Fourier transform infrared spectrophotometer (FTIR);

FIG. 2 is a process diagram illustrating each step of an analytical pretreatment method of microplastics;

DESCRIPTION OF THE PREFERRED EMBODIMENTS

Figure 3:
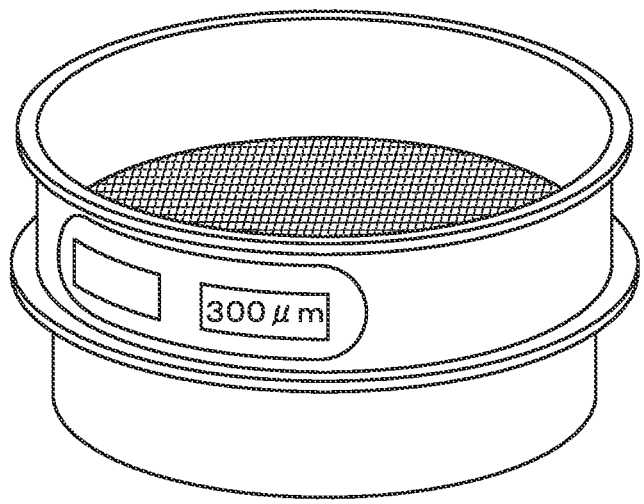
FIG. 3 is an external view of a sieve used in step S3 of FIG. 3.

Hereinafter, an embodiment will be described in detail with reference to the drawings. In the drawings, the same or corresponding portions are denoted by the same reference numerals, and the description thereof will not be repeated.

Generally, a Fourier transform infrared spectrophotometer is used to analyze components of microplastics. The Fourier transform infrared spectrophotometer is such an analysis device that mainly estimates the structure of an organic compound. When the molecule of an organic compound is irradiated with infrared rays, the energy of the infrared rays corresponding to the vibration energy between atoms constituting the molecule is absorbed by the organic compound. The Fourier transform infrared spectrophotometer estimates or quantifies the structure of the organic compound in accordance with an infrared spectroscopy of measuring absorbance of infrared rays.

FIG. 1 is a diagram for explaining an analysis using a Fourier transform infrared spectrophotometer (FTIR). The Fourier transform infrared spectrophotometer 1 includes a light source 3, an interferometer 2, a detector 5, and a computer 6. The interferometer 2 includes a movable mirror 21, a beam splitter 22, and a fixed mirror 23.

The infrared rays emitted from the light source 3 into the interferometer 2 are split by the beam splitter 22 into a light beam toward the fixed mirror and a light beam toward the movable mirror. The fixed mirror 23 is not movable, and the movable mirror 21 is movable. The light beam reflected from the fixed mirror 23 and the light beam reflected from the movable mirror 21 are combined. The combined light beam is an interference wave (interferogram) in which the phase difference between the light beams varies in accordance with the moved distance of the movable mirror 21. The interference wave is irradiated to a sample 4, and the transmitted light is detected by the detector 5.

When the sample 4 is irradiated with the infrared rays in such a manner, the intensity of the transmitted light detected by the detector varies in accordance with the moved distance of the movable mirror 21. The detection result of the detector 5 is subjected to the computer 6 to undergo a Fourier transformation, whereby an infrared spectrum is obtained. Hereinafter, a pretreatment method of the sample 4 to be placed in the Fourier transform infrared spectrophotometer 1 will be described.

FIG. 2 is a process diagram illustrating each step of an analytical pretreatment method of microplastics. First, in step S1, an acid hydrolysis treatment is performed on the microplastics collected from ambient water so as to remove organic substances from the microplastics by using hydrogen peroxide solution or the like.

After the acid hydrolysis treatment is performed on the microplastics collected from ambient water, the microplastics are dehydrated. In the subsequent step S2, a gravity separation treatment is performed by adding an aqueous solution of sodium iodide to the dehydrated the microplastics so as to float the microplastics. An aqueous solution of sodium chloride may be used instead of the aqueous solution of sodium iodide.

In step S3, a particle size separation treatment is performed by using a sieve (300 μm) to collect the microplastics floated by the addition of an aqueous solution of sodium iodide.

FIG. 3 is an external view of the sieve used in step S3 of FIG. 3. A stainless steel sieve illustrated in FIG. 3 is used to collect the microplastics after the gravity separation treatment. Although FIG. 3 illustrate an example sieve which has a mesh size of 300 μm, the mesh size of the sieve may be appropriately changed in accordance with the diameter of the microplastics to be analyzed.

Referring back to FIG. 2, in the subsequent step S4, a sodium iodide removal treatment is performed. In step S4, the sieve is immersed in pure water having a depth smaller than the height of the sieve for about one minute. Then, the sieve is gently lifted up from the pure water. In the sodium iodide removal treatment, if water is applied from the above, the microplastics may be pushed out of the meshes of the sieve by the pressure of water. Therefore, it is important to immerse the microplastics in pure water in a container. In this way, sodium iodide used in the gravity separation treatment is removed. When an aqueous solution of sodium chloride is used instead of the aqueous solution of sodium iodide, sodium chloride is removed.

Then, in step S5, a drying treatment is performed. In the drying treatment, the sieve containing the microplastics is placed in a constant temperature dryer (without a fan) at a temperature of about 30° C. to 50° C. and dried for several hours. If the temperature is too high, the microplastics may undergo degeneration. Further, if the dryer is provided with a fan, the microplastics may be blown away by the fan. The drying treatment is carried out in consideration of the above factors.

Figure 4:
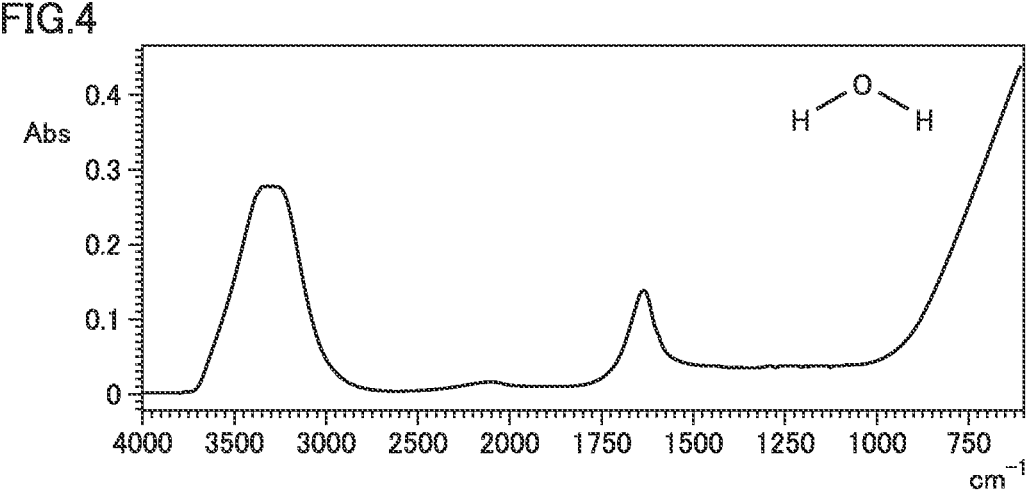
FIG. 4 is a diagram illustrating IR peaks of water.

FIG. 4 is a diagram illustrating IR peaks of water. If the microplastics are not sufficiently dried, the IR peaks of water illustrated in FIG. 4 may overlap with the IR peaks of the microplastics of the analysis result. Thus, it is important to completely dry the microplastics in the constant temperature dryer so as to remove the moisture from the microplastics.

Thereafter, in step S6, the sieve is removed from the dryer, and one grain of the microplastics is picked out from the sieve with a pair of tweezers, and placed in FTIR and analyzed.

Figure 5:
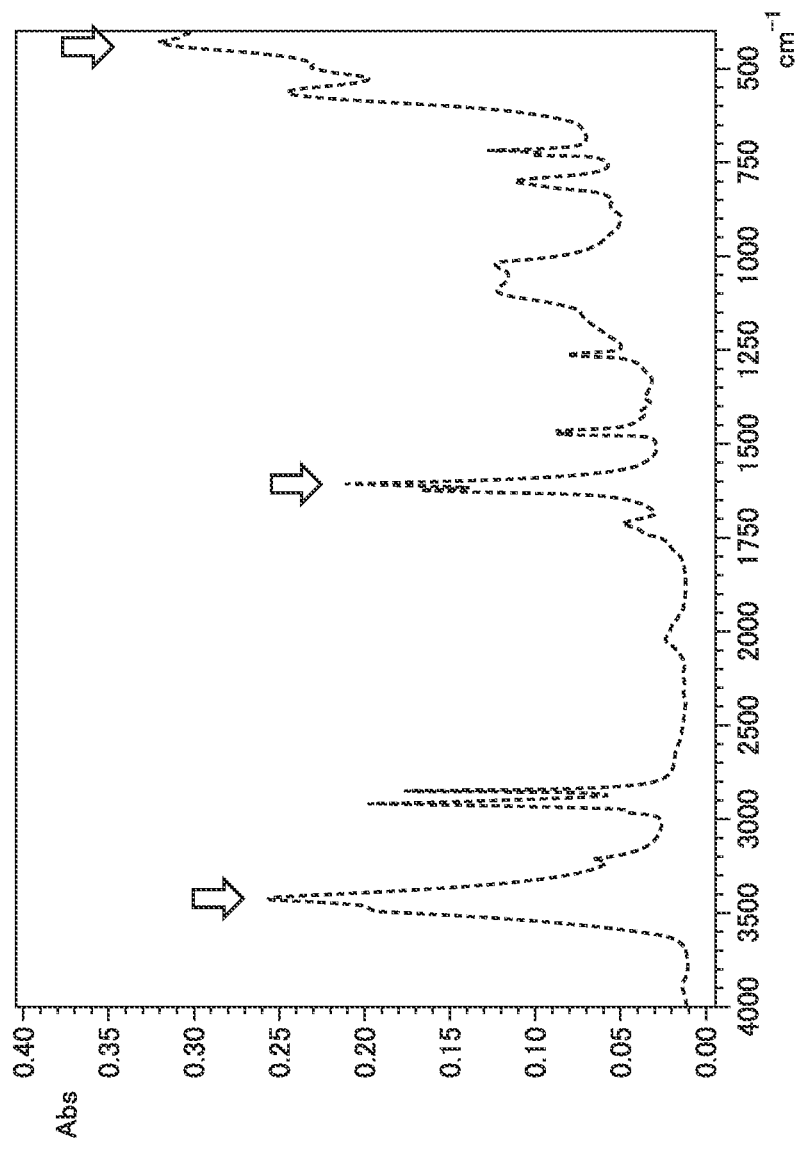
FIG. 5 is a diagram illustrating an analysis result obtained from a comparative sample without pretreatment.
Figure 6:
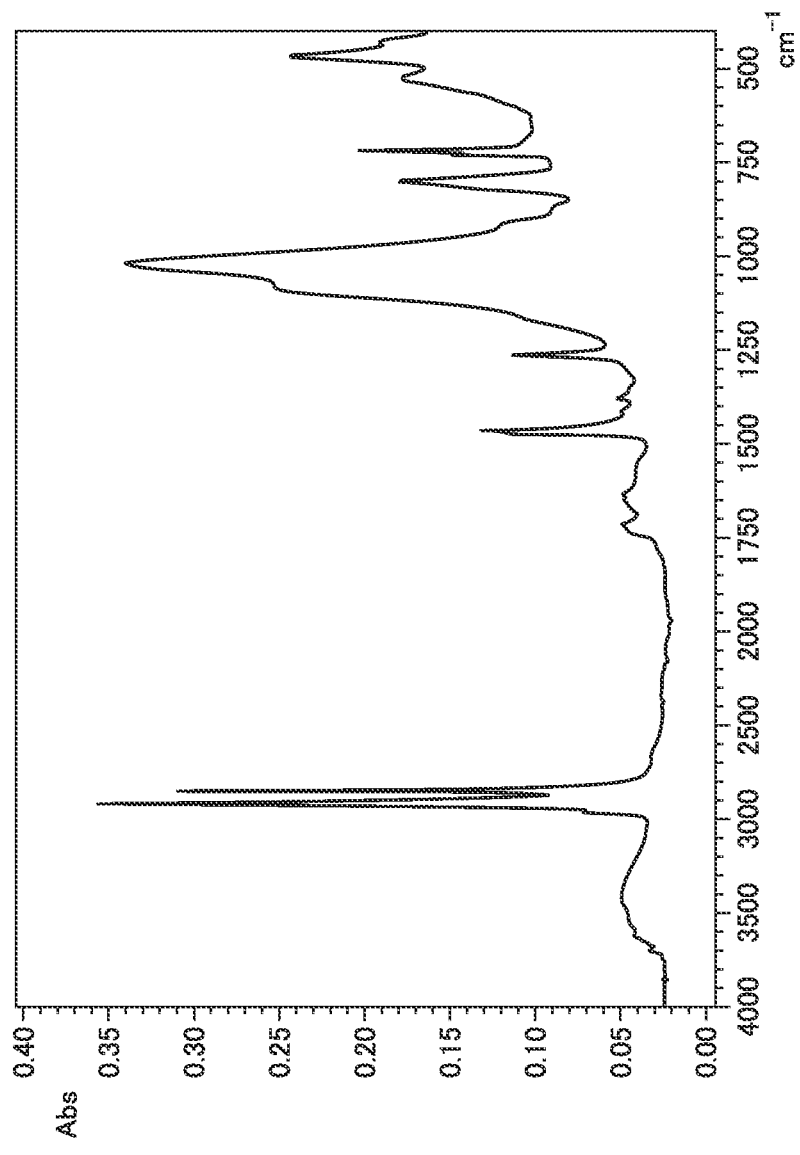
FIG. 6 is a diagram illustrating an analysis result obtained from a sample after pretreatment.
Figure 7:
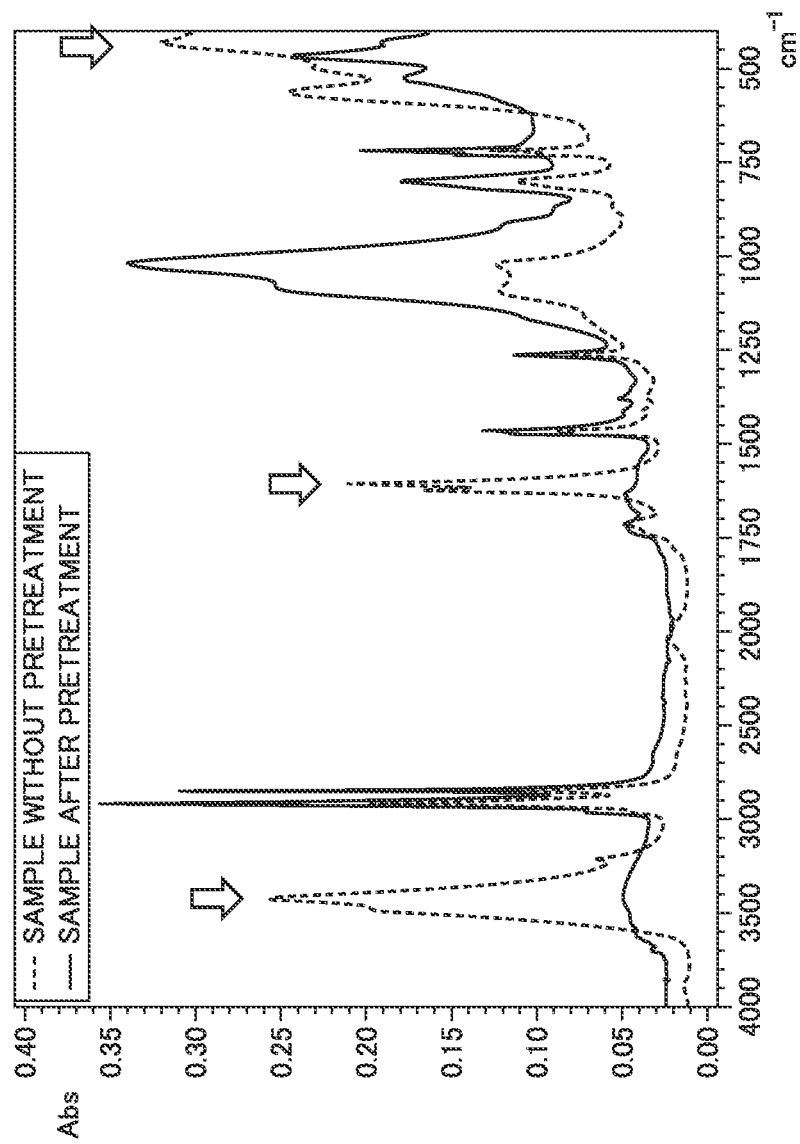
FIG. 7 is a diagram illustrating the waveform of FIG. 5 and the waveform of FIG. 6 in an overlapping manner.

Hereinafter, a comparison between an analysis result where the analytical pretreatment method of the present embodiment is performed and an analysis result where the analytical pretreatment method of the present embodiment is not performed will be described. FIG. 5 is a diagram illustrating an analysis results obtained from a sample without pretreatment (i.e., without being washed with water). FIG. 6 is a diagram illustrating an analysis result obtained from a sample after pretreatment according to the present embodiment. FIG. 7 is a diagram illustrating the waveform of FIG. 5 and the waveform of FIG. 6 in an overlapping manner.

The IR peaks of sodium iodide denoted by arrows in FIGS. 5 and 7 are reduced as compared with those in FIG. 6. In FIG. 6, a target peak becomes significant at a wavelength of 1000 $cm^{-1}$, which makes it possible to obtain an analysis result free from the influence of sodium iodide and water.

[Aspects]

It will be appreciated by those skilled in the art that the exemplary embodiment described above is a specific example of the following aspects.

(1) A first aspect of the present disclosure relates to an analytical pretreatment method of microplastics separated by a gravity separation treatment. The analytical pretreatment method includes: placing the microplastics separated by the gravity separation treatment in a sieve; immersing the sieve containing the microplastics in pure water having a depth smaller than a height of the sieve; and lifting the sieve up from the pure water and drying the microplastics contained in the sieve with a constant temperature dryer.

(2) In the analytical pretreatment method of microplastics described above in (1), the gravity separation treatment includes adding an aqueous solution of sodium iodide or an aqueous solution of sodium chloride to the microplastics.

According to the analytical pretreatment method of microplastics of the present embodiment, when an analysis is performed by FTIR, it is possible to obtain an analysis result free from the influence of a gravity separation solution such as sodium iodide and water.

Although the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. An analytical pretreatment method of microplastics separated by a gravity separation treatment, the analytical pretreatment method comprising:
   placing the microplastics separated by the gravity separation treatment in a sieve;
   immersing the sieve containing the microplastics in pure water having a depth smaller than a height of the sieve; and
   lifting the sieve up from the pure water and drying the microplastics contained in the sieve with a constant temperature dryer.

2. The analytical pretreatment method of microplastics according to claim 1, wherein
   the gravity separation treatment includes adding an aqueous solution of sodium iodide or an aqueous solution of sodium chloride to the microplastics.

\* \* \* \* \*